(12) United States Patent
Kietz et al.

(10) Patent No.: US 8,836,957 B2
(45) Date of Patent: Sep. 16, 2014

(54) OPTOELECTRONIC SENSOR

(75) Inventors: Daniel Kietz, Riegel (DE); Jürgen Bürger, Nimburg (DE); Axel Hauptmann, Waldkirch (DE); Günter Hirt, Steinach (DE)

(73) Assignee: Sick AG, Waldkirch (DE)

( * ) Notice: Subject to any disclaimer, the term of this patent is extended or adjusted under 35 U.S.C. 154(b) by 577 days.

(21) Appl. No.: 13/211,691

(22) Filed: Aug. 17, 2011

(65) Prior Publication Data

US 2012/0086951 A1  Apr. 12, 2012

(30) Foreign Application Priority Data

Oct. 12, 2010  (DE) .......................... 10 2010 038 118

(51) Int. Cl.
G01B 11/08 (2006.01)
G01N 21/86 (2006.01)
G01V 8/20 (2006.01)

(52) U.S. Cl.
CPC ........................................ *G01V 8/20* (2013.01)
USPC ................... 356/621; 356/638; 250/559.12

(58) Field of Classification Search
USPC .................................................. 356/621, 638
See application file for complete search history.

(56) References Cited

U.S. PATENT DOCUMENTS 3,551,683 A  12/1970  Tothill

FOREIGN PATENT DOCUMENTS

| DE | 25 32 602 B2 | 1/1977 |
|----|----|----|
| DE | 29 34 554 A1 | 3/1981 |
| DE | 33 25 136 C1 | 11/1984 |
| DE | 36 35 271 C1 | 10/1987 |
| DE | 10 2005 013 317 A1 | 10/2006 |
| DE | 10 2005 037 490 A1 | 2/2007 |
| DE | 10 2007 043 378 B4 | 4/2009 |
| EP | 1 148 352 B1 | 10/2001 |
| EP | 1821120 A2 | 8/2007 |
| EP | 2071363 A2 | 6/2009 |
| EP | 2144091 A1 | 1/2010 |
| JP | 11-304945 A | 11/1999 |
| JP | 2003-077089 A | 3/2003 |
| JP | 2009-145159 A | 7/2009 |

OTHER PUBLICATIONS

German Search Report issued on Mar. 23, 2011, in corresponding German Application No. 10 2010 038 118.7-52, six (6) pages.
SIPO Office Action in the counterpart Chinese Application No. 201110308854.2, dated Dec. 30, 2013 with English translation, sixteen pages.

*Primary Examiner* — Tarifur Chowdhury
*Assistant Examiner* — Rebecca C Bryant
(74) *Attorney, Agent, or Firm* — Nath, Goldberg & Meyer; Jerald L. Meyer; Sanjana Mangalagiri

(57) ABSTRACT

An optoelectronic sensor (10) is provided with a plurality of light transmitters (14) and light receivers (26) that form between one another a field (20) of mutually parallel monitoring beams (18), wherein beam shaping optics (16, 24) are assigned to the light transmitters (14) and the light receivers (26). The optics (16, 24) comprise a geometry and arrangement leading to a mutual overlap of the optics (16, 24) in a direction diagonal, in particular perpendicular, to the field (20).

13 Claims, 2 Drawing Sheets

OPTOELECTRONIC SENSOR

Figure 1:
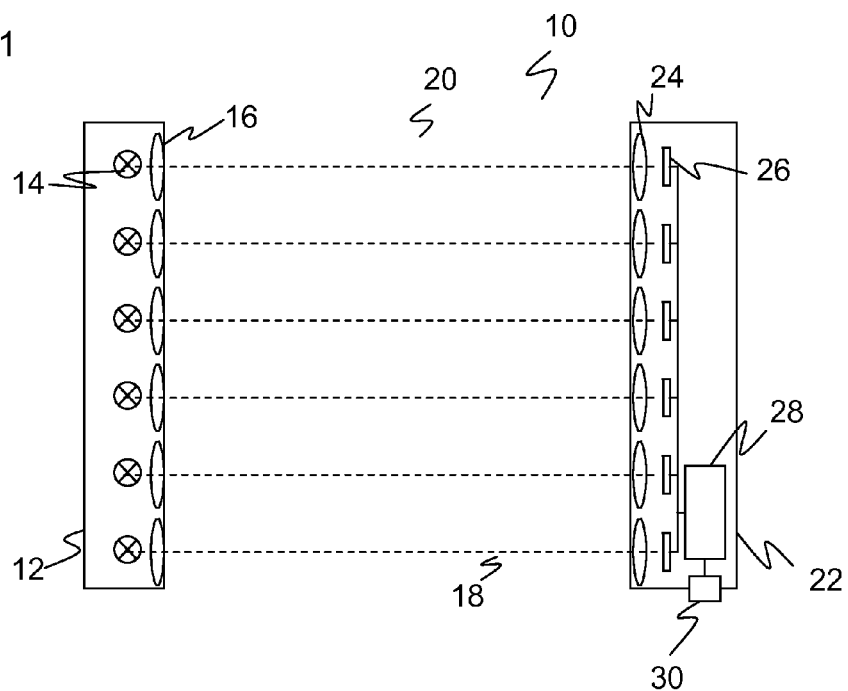

The invention relates to an optoelectronic sensor and a method for determining the height and/or thickness of an object according to the preamble of claims 1 and 13, respectively.

Light grids, sometimes also referred to as light curtains, comprise a plurality of transmission elements and corresponding reception elements, such that each pair of a transmission element and a respective reception element forms a light barrier that detects whether or not the light beam formed between the transmission element and the reception element is interrupted. The transmission elements and the reception elements are combined in a transmission unit and a reception unit, respectively, mounted opposite each other. There are also light grids in which both transmission elements and reception elements are housed in two opposite, mixed transmission and reception units.

The concept of a light beam of the individual transmission elements as a simple light ray is idealized. In fact, light beams having a finite cross-section are generated depending on the aperture angle of the beam shaping optics. In order to keep the requirements of the adjustments on a manageable level, a reception element, at usual distances between transmission unit and reception unit, does not only receive transmission light from the corresponding transmission element, but also from its neighbors due to the transmission beam divergence. Thus, in order to avoid evaluation errors, the transmission elements are cyclically activated. Individual light pulses or light packets are sequentially transmitted by each transmission element, and during a certain time window only the corresponding reception element is activated to determine whether there is an object in the respective light beam. In this context, the light beams are also referred to as channels.

To that end, the reception unit needs to know the time window during which a respective transmission element is active, and also which transmission element is active during this time window. Therefore, transmission unit and reception unit are synchronized with each other. Preferably, an optical synchronization is used to avoid a cable connection between transmission unit and reception unit.

An important field of application for light grids is safety technology. There, the parallel light beams are used as a kind of virtual wall, and in case of interruption by an object, for example, a source of danger is secured. In automation technology, light grids are used for object measurement to measure the position and dimension of objects from the position and number of interrupted beams. For example, the height of objects being moved on a conveyor belt can be determined in this manner.

One advantage of light grids in such measurement tasks as compared to other optoelectronic sensors, such as scanners or light stripe sensors, is that all beams are parallel, and therefore there is no shadowing and no geometrically caused distortion of the object. The disadvantage is the limited resolution, because the detection performance of the light grid for small objects is limited by the mutual distance of two adjacent beams. In the same way, the accuracy in determining the position of object edges of larger objects is limited. Such objects are detected, but measured with a resolution no better than the beam spacing. In case an object is positioned in a gap between two beams, it cannot be detected. The smaller the objects to be detected are, the smaller the beam spacing has to be.

Hence, the obvious possibility to increase the resolution of a light grid and its detection performance for small objects, respectively, is a reduction of the beam spacing in order to decrease the gap between adjacent beams. Consequently, additional transmission and reception elements are necessary for a same measuring field. This increases the costs and also the response time because of the extended evaluation cycle in which the beams are sequentially activated to avoid ambiguous reception signals.

Another approach is called cross-beam technology. There, a reception element evaluates not only beams of the corresponding opposite transmission element, but also adjacent transmission beams. Thereby additional oblique beams result that are used to detect objects in between the original straight aligned beams. However, the increase in resolution is not possible for the entire monitoring area and is also irregular due to the dependence on the distance from the object to the transmission element and the reception element, respectively. For the same reason, the object detection by a cross beam does not allow a geometric mapping of the object to the monitoring height. Thus, a binary object presence detection is possible in gaps in between the original, straight aligned beams, but no measurement. Moreover, the response time is increased because the evaluation cycle is extended by the activity time windows of the cross beams.

An evaluation based on energy is applicable if the beam diameter is large enough that, at a given grid pattern, two beams adjoin. Then, in contrast to the usual binary evaluation for beam interruptions with a threshold comparison, a quantitative degree of the object coverage of the respective beam is determined. Thus, objects smaller than the beam diameter are also detected. As with the cross-beam technology, no geometric mapping of the object to the monitoring height is possible. The light grid detects the small objects and can also derive a thickness information from the degree of coverage, but has no information whatsoever where the object is positioned within the beam diameter. Accordingly, the position resolution is not improved. In addition, the light grid cannot distinguish between a signal reduction due to partial coverage by an object or a partially transparent object on the one hand and ambience conditions on the other, like a contamination of the beam shaping optics.

It is therefore an object of the invention to improve the resolution of a light grid.

This object is satisfied by an optoelectronic sensor according to claim 1 and a method for determining the height and/or thickness of an object according to claim 13. The invention starts from the basic idea to exploit the signal information in a gap of adjacent beams. In order to generate sufficient signal information, the beams are to be virtually intertwined to enable a differential signal evaluation for an increase in resolution. This is achieved by special beam-shaping optics for the light transmitters and the light receivers where the optics mutually overlap in a direction diagonal to the monitoring field. In this context, overlap does not mean that the lenses are physically positioned on top of each other, but that an overlap results when viewed from the direction as just defined. This overlap results in a corresponding overlap of the associated light beams.

The overlap is preferably provided not merely diagonal, but basically perpendicular to the monitoring field. In this and subsequent paragraphs, the term preferably describes preferred, but optional features that are not necessarily required for the invention. An exactly aligned perpendicular overlap is not required. For example, a mutual offset of the optics in beam direction is conceivable. Only the effect is important, namely that an object, in contrast to conventional light grids, affects the reception level of multiple beams at one and the same height in order to enable the differential evaluation.

The invention has the advantage that no increase in beam number is required and, hence, the increase in resolution comes at practically no costs. An actual increase in resolution is achieved that allows for a geometrical mapping in the monitoring area. Despite the increased resolution, the number of individual beams to be evaluated and therefore the response time remains constant. A sub pixel resolution with locating of small objects is achieved.

Provided it is ensured that the objects to be detected are directly in front of the light receivers, it is sufficient to design only the optics on the receiving side with overlapping. In general, however, optics according to the invention are assigned to both the light transmitters and the light receivers.

The optics preferably comprise a geometry and arrangement where due to the overlap any imaginary line perpendicular to the field intersecting a monitoring beam being not arranged at an edge of the field intersects at least one further monitoring beam. This imaginary line has a certain width expansion, because physical and not mathematical objects are to be detected. Thin regions where objects do not sufficiently overlap to meet the above condition are therefore irrelevant. The overlap is thus large enough that an object in every monitoring height affects the reception level of at least two reception elements, such that a differential signal is always available. The only exceptions from this condition are the two beams at the edge of the monitoring field. It is also conceivable to provide only at least one partial area of the monitoring area where the overlap of the monitoring beams as defined occurs. This sensor has an increased resolution only in the partial areas rather than over the entire monitoring height.

The optics preferably comprise an elliptical-shaped, triangular-shaped or quadrangular-shaped geometry. With these geometries, beams can be shaped that achieve the required intertwining. Rounded beam cross sections are more easily and more homogeneously implemented from an optical point of view, whereas angular beam cross sections allow for an overlap without gaps.

Each of the optics preferably has the same area. This eliminates the need to consider level differences due to the beam cross section. On the other hand, it is also conceivable to calculate or teach these level differences due to differences in area. In a preferable embodiment, each of the optics has even the same geometry. This adds a simplified manufacturing and handling to the simplified evaluation.

The optics are preferably regularly arranged in a row on two opposite edges of the field. Thereby a uniform resolution over the entire monitoring height is achieved.

Preferably, an evaluation unit is provided that is configured to determine a height and/or thickness of objects in the field based on the reception levels of light receivers adjacent to each other with a better resolution than the distance between two adjacent monitoring beams. The height of an object is the position of the object or an edge of the object in height direction. With thickness, on the other hand, it is referred to the object's own dimension in height direction. Hence, if the sensor and the object are flush at the bottom, height and thickness of an object are the same. However, when considering a small object amid the monitoring field, for example, height and thickness are two different measuring values. Due to the overlapping optics, a sub pixel evaluation is possible for both measuring values, i.e. a measurement more accurate than the beam spacing.

The evaluation unit is preferably configured to determine the height and/or thickness based on a quotient and/or a difference of the reception levels of adjacent light receivers. From the differential evaluation of the reception level, a measurement with sub pixel resolution for thickness or height in a gap between two conventional channels results. In order to measure larger objects, such sub pixel measurements from both edges of an object are added to a measurement corresponding, as in the conventional measurement, to the number of beams that are completely covered.

In addition or alternatively, the evaluation unit is preferably configured to determine the height and/or thickness based on a reception level of a light receiver as compared to a maximum reception level of the light receiver. This evaluation based on energy gives additional measurement information about the thickness or height of the object. To that end, the relative reception level is determined where the reference is the maximum, i.e. the reception level for a free optical path.

An expected dependence of the reception level of the light receivers on the height and/or thickness is preferably taught to or stored in the evaluation unit in advance. Teaching means to operate the sensor under defined conditions and to thereby determine or improve the knowledge about the dependence. Stored dependencies, on the other hand, are parameterized or transferred from a data carrier at the factory or at a later time. The functional dependence of the reception level can in particular be taught or stored for a fixed, known thickness and a varying height. More preferably, an object of small thickness is used, such as $1/3$, $1/10$ or even less of the beam spacing. In this manner, a one dimensional curve for each light receiver is obtained from which the evaluation unit can directly read the necessary relation of the current signal levels and the variable to be measured, i.e. the height. By integration, at least under the assumption of homogenous beams, the conversion to other fixed thicknesses is possible, enabling height measurements for every thickness. The thickness itself can, for example, be determined by a measurement based on energy. If the dependencies are taught, rather than calculated from the optical parameters and the geometry, inhomogeneities of the beams are compensated.

The evaluation unit is preferably configured to diagnose optics as contaminated if the reception level of the light receiver decreases but the reception levels of adjacent light receivers do not. Because of the overlapping optics, it is not plausible that an object affects the reception level of only one light receiver. Therefore, the sensor can deduce a contamination in this situation. Then, an evaluation is made whether the contamination is critical, and possibly a maintenance request is output. On the other hand, the sensor can also compensate the contamination in the continued operation, be it by means of increased transmission power of the affected light transmitter, increased reception sensitivity, or computationally taking the effects of contamination into account.

The method in accordance with the invention can be further developed in a similar manner with additional features and shows similar advantages. Such advantageous features are described in an exemplary, but not exclusive manner in the subordinate claims following the independent claims.

Figure 2A:
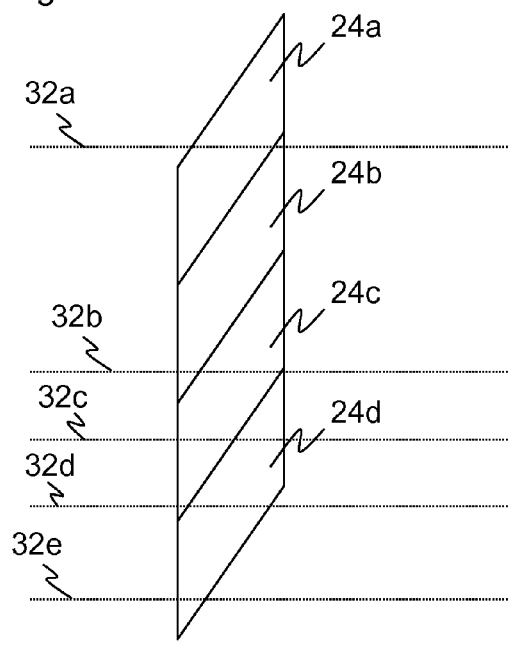
Figure 2B:
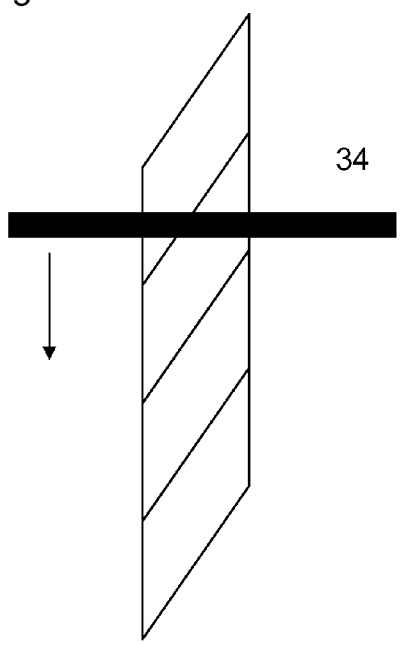
Figure 3:
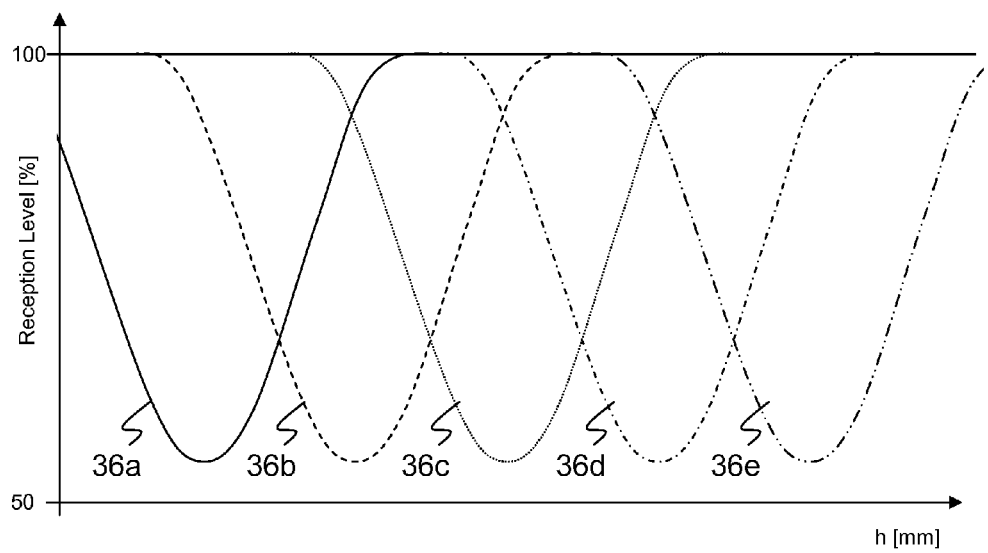
Figure 4A:
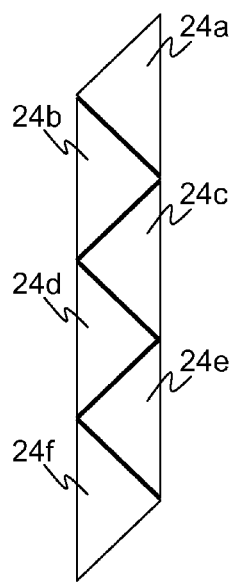
Figure 4B:
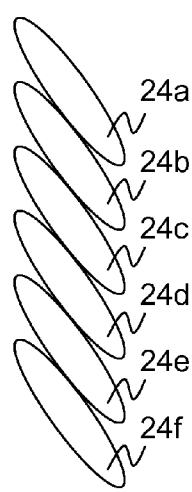

The invention will be explained in the following also with respect to further advantages and features with reference to exemplary embodiments and the enclosed drawing. The Figures of the drawing show in:

FIG. 1 a schematic cross-sectional view of a light grid;

FIG. 2a a front view of an exemplary embodiment of overlapping optics with several auxiliary lines to explain the effect on the generated monitoring beams;

FIG. 2b a front view according to FIG. 2a with a beam interrupting moving test object;

FIG. 3 a representation of the relative reception levels of the individual light receivers in dependence of the position of the test object in FIG. 2b; and FIG. 4a-b front views of other embodiments of overlapping optics according to the invention.

FIG. 1 shows a schematic cross-sectional view of a light grid 1. A transmission unit 12 comprises a plurality of light transmitters 14 arranged in a row, for example LEDs or lasers in an infrared or another spectrum. The light of the light transmitters 14 is collimated in respective transmission optics 16 and transmitted as light beams 18 through a monitoring area 20 to a reception unit 22. The light beams 18 impinge via reception optics 24 on light receivers 26 corresponding to each light transmitter 14. The light receiver 26 is usually made as a photo diode, but can also be a position sensitive CCD or CMOS image sensor.

The transmission optics 16 and the reception optics 24 may include, contrary to the representation, other elements like additional lenses, apertures and the like, and are designed such that the light beams 18 have a desired beam profile. An evaluation unit 28 is connected to the light receivers 26 and receives electrical reception signals corresponding to the reception levels of the individual light receivers 26. For that purpose, the light transmitters 14 and the light receivers 26 are cyclically and sequentially activated in a time division multiplexing. From the reception levels, the evaluation unit 28 determines whether there is an object in the monitoring area. If that is the case, the evaluation unit 28 determines the height and/or thickness of the object. The sensor provides the result of the evaluation as a binary object presence signal, height and thickness of an object, respectively, at an output 30 depending on the embodiment, application and parameterization.

The design of the beam shaping optics and the sub pixel resolution by differential evaluation in the light grid 10 enabled by the optics is now explained in more detail with reference to FIGS. 2 and 3. FIG. 2a shows the beam shaping optics 24 of the reception unit 22. It should be noted that this is not a perspective view, but a front view.

The cross section of the individual lenses 24a-d is therefore a parallelogram. The beam shaping optics 16 on the transmission side are designed identically. Thus, the transmitted light beams 18 also have the cross section as shown. In practice, the physical light beams themselves due to divergence of the light transmitters 14 on the one hand and the reception areas themselves due to larger aperture angles on the reception side on the other hand may deviate from this shape. However, the detection area of each light beam 18 that is monitored for object intrusions is formed by the direct lines of sight and therefore still corresponds to the cross section as illustrated.

The invention does not depend on the particular shape of the individual lenses 16, 24 as illustrated. The essential feature is an overlap at a monitoring height, the height being a vertical axis in the example of FIG. 1. Thus, individual light beams 18 are mutually intertwined. This can also be explained by means of imaginary or auxiliary lines 32a-e diagonal, i.e. oblique or slanted, preferably even perpendicular to the monitoring area 20 formed by the parallel light beams 18. These lines 32a-e are diagonal or perpendicular, respectively, to the plane of FIG. 1 and horizontal in the front view of FIG. 2. The lines 32a-e are to intersect, at least in a partial area and preferably in the entire monitoring field 20, at least two optics 16, 24 or light beams 18, respectively. This condition naturally cannot be met for the lines 32a, 32e at the edge of the monitoring field 20. The overlap results in an object in the monitoring field 20 at least partially interrupting at least two light beams 18 at the same time.

In FIG. 2b a test object 34 of a thickness less than the distance between two light beams 18 is moved with varying heights through the monitoring field 20. Due to the overlap of the optics 16, 24 and, hence, of the light beams 18 as explained above, the test object 34 affects at least two light beams 18 at each height. Because of the cyclic evaluation, the evaluation unit 28 can determine the received light quantity for each light receiver 26 and thus the light quantity detected in each individual channel with an individual lens 24a-d.

With a uniform movement of the test object 34, the function of the relative reception level in dependence of the height can be determined for each channel. Here, the reception levels 36a-e for five channels are shown by different line styles as an example. As can be clearly seen, there is a relative reception level at each height of the test object 34 in at least two channels that differs from a non-interrupted channel and therefore corresponds to an object detection. For a conventional light grid, the individual reception levels 36a-e would be completely independent on the height axis, which means that for one and the same height only the respective reception level 36a-e of one channel would respond to the test object 34.

The evaluation unit 28 now has the ability to unambiguously infer the height of the test object 34 from the reception levels 36a-e. To that end, the expected dependencies of the reception levels 36a-e on the height are known to the evaluation unit 28 in advance, be it by a setting at the factory of an initial teaching. In operation, the ratio or quotient of adjacent reception levels 36a-e or their difference is considered and evaluated based on the known dependency of the reception levels 36a-e on the height.

From the reception levels 36a-e in dependence of the height at a fixed thickness of the test object 34, corresponding calibration curves for larger thicknesses can be derived by integration. Hence, once calibration curves for the thinnest test object 34 to be detected is known to the evaluation unit 28, all further thicknesses can be determined from that by calculation. As an alternative, calibration curves for different thicknesses are measured and taught. This has the advantage that inhomogeneities of the light transmitters 14 and optics 16, 24 actually in use can be taken into account. For objects whose thickness exceeds the beam spacing, the differential evaluation as described is only relevant for the edges. Additionally, a multiple of the beam spacing is to be added corresponding to the number of interrupted beams.

With help of the energy reduction, the thickness of the object may also be determined. This is not done by differentially considering comparisons or ratios of adjacent beams, but the decrease of the reception level 36a-e within a channel. Sometimes the energy reduction in several channels has to be evaluated to obtain a reliable measurement.

FIG. 4 shows alternative embodiments of the optics 16, 24 and therefore alternative beams cross sections and beam arrangements. This selection is to be understood as an example, the invention includes further arrangements and cross-sectional geometries like as trapezoids, hexagons and others.

In FIG. 4, the lenses 24a-f are triangular, having in particular the shape of an isosceles triangle. As explained with reference to FIG. 2a, preferably the transmission lenses 16 and hence the cross section of the beams 18 have the same shape. For all angular shapes, the corners can be rounded. Angular cross sections enable to cover the cross section of the monitoring field 20 of the entire area. With elliptical lenses 24a-f as in FIG. 4b, gaps are left at the edge areas that may lead to inaccuracies in the measurements. However, there can be applications where these gaps are irrelevant, for example because of a minimum extend of the objects in the transversal direction, or where the inaccuracies are accepted in favor of more manageable optics 16, 24.

The invention claimed is:

1. An optoelectronic sensor (10), with a plurality of light transmitters (14) and light receivers (26) that form between one another a field (20) of mutually parallel monitoring beams (18), wherein beam shaping optics (16, 24) are assigned to the light transmitters (14) and the light receivers (26), characterized in that the optics (16, 24) comprise a geometry and arrangement leading to a mutual overlap of the optics (16, 24) to the field (20) where due to the overlap any imaginary line (32) perpendicular to the field (20) intersecting a monitoring beam (18) that is not arranged at an edge of the field (20) intersects at least one further monitoring beam (18).

2. The sensor (10) of claim 1, wherein the optics (16, 24) comprise an elliptical-shaped, triangular-shaped or quadrangular-shaped geometry.

3. The sensor (10) of claim 1, wherein each of the optics (16, 24) has the same area.

4. The sensor (10) of claim 1, wherein each of the optics (16, 24) has the same geometry.

5. The sensor (10) of claim 1, wherein the optics (16, 24) are regularly arranged in a row on two opposite edges of the field (20).

6. The sensor (10) of claim 1, wherein an evaluation unit (28) is provided that is configured to determine a height and/or thickness of objects in the field (20) based on the reception levels (36) of light receivers (26) adjacent to each other with a better resolution than the distance between two adjacent monitoring beams (18).

7. The sensor (10) of claim 6, wherein the evaluation unit (28) is configured to determine the height and/or thickness based on a quotient of the reception levels (36) of adjacent light receivers (26).

8. The sensor (10) of claim 6, wherein the evaluation unit (28) is configured to determine the height and/or thickness based on a difference of the reception levels (36) of adjacent light receivers (26).

9. The sensor (10) of claim 6, wherein the evaluation unit (28) is configured to determine the height and/or thickness based on a reception level (36) of a light receiver (26) as compared to a maximum reception level of the light receiver (26).

10. The sensor (10) of claim 6, wherein an expected dependence of the reception level (36) of the light receivers (26) on the height and/or thickness is taught to or stored in the evaluation unit (28) in advance.

11. The sensor (10) of claim 6, wherein the evaluation unit (28) is configured to diagnose optics (16, 24) as contaminated if the reception level (36) of the light receiver (26) decreases but the reception levels (36) of adjacent light receivers (26) do not.

12. The sensor of claim 1, characterized in that the optics (16, 24) comprise a geometry and arrangement leading to a mutual overlap of the optics (16, 24) in a direction diagonal, to the field (20).

13. The sensor of claim 1, wherein the sensor is a light grid.

* * * * *